(12) United States Patent
Liu et al.

(10) Patent No.: US 7,127,174 B2
(45) Date of Patent: Oct. 24, 2006

(54) HYBRID-INTEGRATED HIGH-SPEED OTDM MODULE

(75) Inventors: Tiangong Liu, Mountain View, CA (US); Jinghui Li, San Jose, CA (US); Tongqing Wang, Los Altos, CA (US)

(73) Assignee: Oplink Communications, Inc., San Jose, CA (US)

( * ) Notice: Subject to any disclaimer, the term of this patent is extended or adjusted under 35 U.S.C. 154(b) by 674 days.

(21) Appl. No.: 09/988,053

(22) Filed: Nov. 16, 2001

(65) Prior Publication Data

US 2003/0095311 A1   May 22, 2003

(51) Int. Cl.
*H04J 14/08* (2006.01)
(52) U.S. Cl. ............... 398/102; 398/98; 398/99; 398/100; 398/101; 398/103; 398/182; 398/183; 398/200; 398/201; 398/190; 398/191
(58) Field of Classification Search ............... 398/102, 398/182, 183, 190, 191, 161, 98, 99, 100, 398/101, 103, 200, 201
See application file for complete search history.

(56) References Cited

U.S. PATENT DOCUMENTS

| | | | |
|---|---|---|---|
| 4,768,848 A * | 9/1988 | Vaerewyck | 385/14 |
| 5,111,322 A * | 5/1992 | Bergano et al. | 398/74 |
| 5,331,451 A | 7/1994 | Mozer | 359/139 |
| 5,959,753 A | 9/1999 | Duling, III et al. | 359/158 |
| 6,118,564 A | 9/2000 | Ooi et al. | 359/139 |
| 6,178,022 B1 | 1/2001 | Yoneyama | 359/123 |
| 6,256,124 B1 * | 7/2001 | Hait | 398/9 |
| 6,262,823 B1 | 7/2001 | Nowatzyk | 359/140 |
| 6,271,952 B1 * | 8/2001 | Epworth | 398/147 |
| 6,607,313 B1 * | 8/2003 | Farries et al. | 398/102 |
| 6,724,994 B1 * | 4/2004 | Collings et al. | 398/75 |
| 2001/0017724 A1 | 8/2001 | Miyamoto et al. | 359/158 |
| 2001/0019440 A1 | 9/2001 | Davidson | 359/135 |
| 2001/0019442 A1 | 9/2001 | Shikata et al. | 359/181 |
| 2002/0003641 A1 * | 1/2002 | Hall et al. | 359/122 |

* cited by examiner

*Primary Examiner*—Hanh Phan
(74) *Attorney, Agent, or Firm*—Fish & Richardson P.C.

(57) ABSTRACT

A novel optical time division multiplexing (OTDM) module based on hybrid-integrated optical chips is disclosed. An integrated modulator chip generates optical RZ signal streams which are then interleaved in an integrated time-delay chip to produce an OTDM signal. The integrated modulator chip is coupled and secured to the integrated time-delay chip via a suitable optical index-matching layer or collimating lenses. Such an approach alleviates the stability problems offered by conventional fiber-based OTDM technology and aids in reducing the size and complexity as well as lowering the cost for the assembly. Furthermore, the time-delay chip of the present invention offers fine tuning capabilities thereby allowing for slight adjustments in the interleaving of optical signal streams when non-standard data transmission rates are required.

20 Claims, 3 Drawing Sheets

HYBRID-INTEGRATED HIGH-SPEED OTDM MODULE

FIELD OF THE INVENTION

This invention relates to optical time division multiplexing (OTDM) and, more particularly, to an optical time division multiplexing module based on hybrid-integrated optical chips.

BACKGROUND OF THE INVENTION

In general, there are two common data formats for the transmission of high-speed digital data. Non-Return-to-Zero (NRZ) signal format is the more popular of the two formats due to its inherent simplicity. In this particular format, each "0" or "1" data bit is represented by a low or high signal level, respectively, lasting an entire clock period. However, with ever-increasing data rates, especially in optical transmission systems, Return-to-Zero (RZ) signal formats are becoming the transmission format of choice. In RZ modulation format, each data bit occupies only a portion of the clock period creating a distinct transition between adjacent bits and, thereby, producing a cleaner optical signal for the receiver to read. For high-rate (>10 Gbit/s) or ultra-long-haul (>1000 km) transmission, the RZ modulation technique is now coming into vogue as it affords certain efficiency gains such as higher signal-to-noise ratio (SNR) and lower crosstalk amongst adjacent bits. In this way, bit-error-rate (BER) may be improved. RZ encoding also offers better immunity to fiber nonlinear effects and the effects of polarization mode dispersion (PMD), factors which can limit long-haul or high-rate transmission severely. Optical transmission based on OTDM technology uses the RZ format primarily because of the relative ease it affords for multiplexing in the optical time domain.

The explosive growth of the Internet, and the corresponding demand for bandwidth has necessitated the introduction of optical time division multiplexing (OTDM) technology. The bandwidth of electrical components currently used for multiplexing and routing is rapidly being pushed to its fundamental physical limit. With the tremendous growth in data traffic predicted over the next few years, OTDM technology will be needed to avoid the potential electronic bottleneck that these multiplexers and routers will impose upon the next generation Internet.

In today's optical backbone network, dense wavelength division multiplexing (DWDM) enables high capacity transmission by combining multiple optical carriers on a single fiber. Each carrier or wavelength is modulated with a data channel having a rate up to, for example, 10 Gbps. In this way, the electronic bottleneck may be alleviated by shifting the electrical multiplexing to the optical spectral domain. However, the operation and management of DWDM systems is highly complicated and costly. Accordingly, single wavelength systems with higher data rates e.g. 40 or 80 Gbits/s are resurfacing as an alternative to DWDM systems in order to maintain the same total capacity. Single wavelength channels with higher rates could be multiplexed together to form a higher capacity DWDM system. Therefore, a key issue is to achieve higher rates per single optical channel which cannot be achieved by electrical time division multiplexing (ETDM) technology. OTDM technology is used for achieving higher rate per single channel in the optical domain.

In optical transmission systems, the bit rate is rising continuously. Target values for the future are on the order of 40 to 80 Gbit/s. With known transmitter combinations of semiconductor lasers with external modulators, such target values are attainable only with great difficulty. However, signal streams generated by individual transmitters may be combined in an optical time division multiplexer to make a signal stream with a higher bit rate.

The fundamental premise of OTDM technology is to solve the bandwidth bottleneck problem that ETDM technology is not currently able to address. ETDM technology is based on a traditional scheme of multiplexing individual lower-rate electronic signals into a high-speed serial electronic signal. The high-speed serial electrical signal may then be converted to an optical signal using a directly modulated laser or external modulator. These methods have worked well for data transmission rates up to 40 Gbit/s. However, electrical components for ETDM technology such as electrical multiplexers and demultiplexers (EMUXs and EDMUXs), that can achieve the high data rates (e.g. work beyond 40 Gbit/s) required today, are not expected to be available for the next several years.

On the other hand, OTDM technology makes the implementation of 80 Gbit/s, 160 Gbit/s or even higher capacity systems more achievable as compared to their electrical counterparts. In this lies the biggest advantage of OTDM technology. OTDM also opens the door for higher-rate nonlinear optical transmission such as, for example, soliton transmission which may make it possible to achieve transmission rates as high a 160 Gbit/s for very long distances without regeneration.

OTDM technology is based on a purely optical method for achieving very high data rate systems. For example, to generate an 80 Gbit/s RZ data stream, a 40 GHz clock pulse with, say, a pulsewidth of 6 picoseconds is first generated. Two sets of four 10 Gbit/s NRZ electrical signals may then be multiplexed via 4:1 EMUXs to form two 40 Gbit/s NRZ signal streams. The two 40 Gbit/s NRZ signal streams may then be applied to two corresponding external optical modulators to gate the incoming 40 GHz RZ clock pulses. In this way, the NRZ electrical signals are converted to RZ optical signals. One of the two 40 Gbit/s optical RZ signal streams may then be delayed by half a clock period to allow for interleaving in the time domain. The two 40 Gbit/s optical RZ signal streams may then be combined to form the final 80 Gbit/s optical RZ data stream.

The advantage of OTDM technology is that it alleviates the bandwidth bottleneck that ETDM technology is not able to currently address. Furthermore, the data received after transmission is of a better quality than that achieved through ETDM techniques. For example, generation of a 40 Gbit/s signal can easily be achieved through OTDM by applying two 20 Gbit/s NRZ electrical signal streams on an optical multiplexer (OMUX) e.g combination of two amplitude modulators and then delaying one optical data stream 25 ps relative to the other. Interleaving these two signal streams will then produce a 40 Gbit/s signal.

However, there is a downside to OTDM technology as well. Specifically, current OTDM implementations are relatively more complicated, expensive, and bulky than their counterpart ETDM solutions which normally just consist of integrated electronic chips. SO even though it's easier to get to 40 Gbit/s systems using OTDM technology today (because 40 Gbit/s electronics have not been fully developed), these are not very easy systems to build and manage. Even so, for data rates greater than 40 Gbit/s, OTDM technology is definitely the technology of choice in that it satisfies important transmission requirements e.g. minimal chromatic dispersion, reduced polarization mode dispersion and reduced impact of fiber non-lineararaties.

Today, 40 Gbit/s ETDM systems are, in fact, emerging. Compared to current OTDM implementations, ETDM is generally more compact and cost effective due to processing technology available for electronic chip integration. However, for higher rate (e.g. 80 Gbit/s) and long-haul transmission requiring minimal chromatic and polarization mode dispersion, the use of OTDM technology is more effective than ETDM.

Existing approaches for OTDM implementation are based on fiber optics and discreet electro-optic components. For example, the optical clock pulse described above may be divided amongst the two modulators via a fiber coupler and the delay required for interleaving may be realized by using fiber of differing lengths. The two RZ optical signal streams may then be combined, again using a fiber coupler, These kind of approaches are rather expensive and bulky and face stability and processing problems.

SUMMARY OF THE INVENTION

Optical time division multiplexing (OTDM) is a technique which takes advantage of the Return-to-Zero (RZ) transmission format to alleviate the electronic bandwidth bottleneck. In its simplest form, the OTDM technique attempts to insert one bit of data between two adjacent bits to produce a higher (e.g. double) frequency data rate. Very extensive research has been performed within the field of optical time division multiplexing (OTDM) for generating ultra-high bit rate signals at and in excess of 40 Gbit/s. To generate OTDM signals, very high quality short pulse sources based on mode-locking lasers or external modulators are required, as well as high-precision optical multiplexers. The present invention proposes a novel optical time division multiplexing (OTDM) module based on hybrid-integrated optical chips.

According to a broad aspect of the present invention, there is provided an integrated optical time division multiplexing (OTDM) module comprising an integrated modulator chip for generating at least first and second optical RZ signal streams and an integrated time-delay chip coupled to the integrated modulator chip for introducing a prescribed optical delay between said at least first and second optical RZ signal streams and for combining said at least first and second optical RZ signal streams after introduction of the prescribed delay.

The integrated modulator and time-delay chips of the present invention may be coupled and secured together via a suitable refractive index matching layer such as epoxy. Alternatively, collimating lenses may be used to couple and secure the integrated modulator chip with the integrated time-delay chip. The integrated OTDM module of the present invention alleviates the stability problems offered by conventional fiber-based OTDM technology and aids in reducing the size and complexity as well as lowering the cost for the assembly. Furthermore, the integrated time-delay chip of the present invention offers fine tuning capabilities thereby allowing for slight adjustments in the interleaving of optical signal streams when non-standard data transmission rates are required.

Other aspects and features of the present invention will become apparent to those ordinarily skilled in the art upon review of the following description of specific embodiments of the invention in conjunction with the accompanying drawings.

DETAILED DESCRIPTION OF THE PREFERRED EMBODIMENTS

Figure 1:
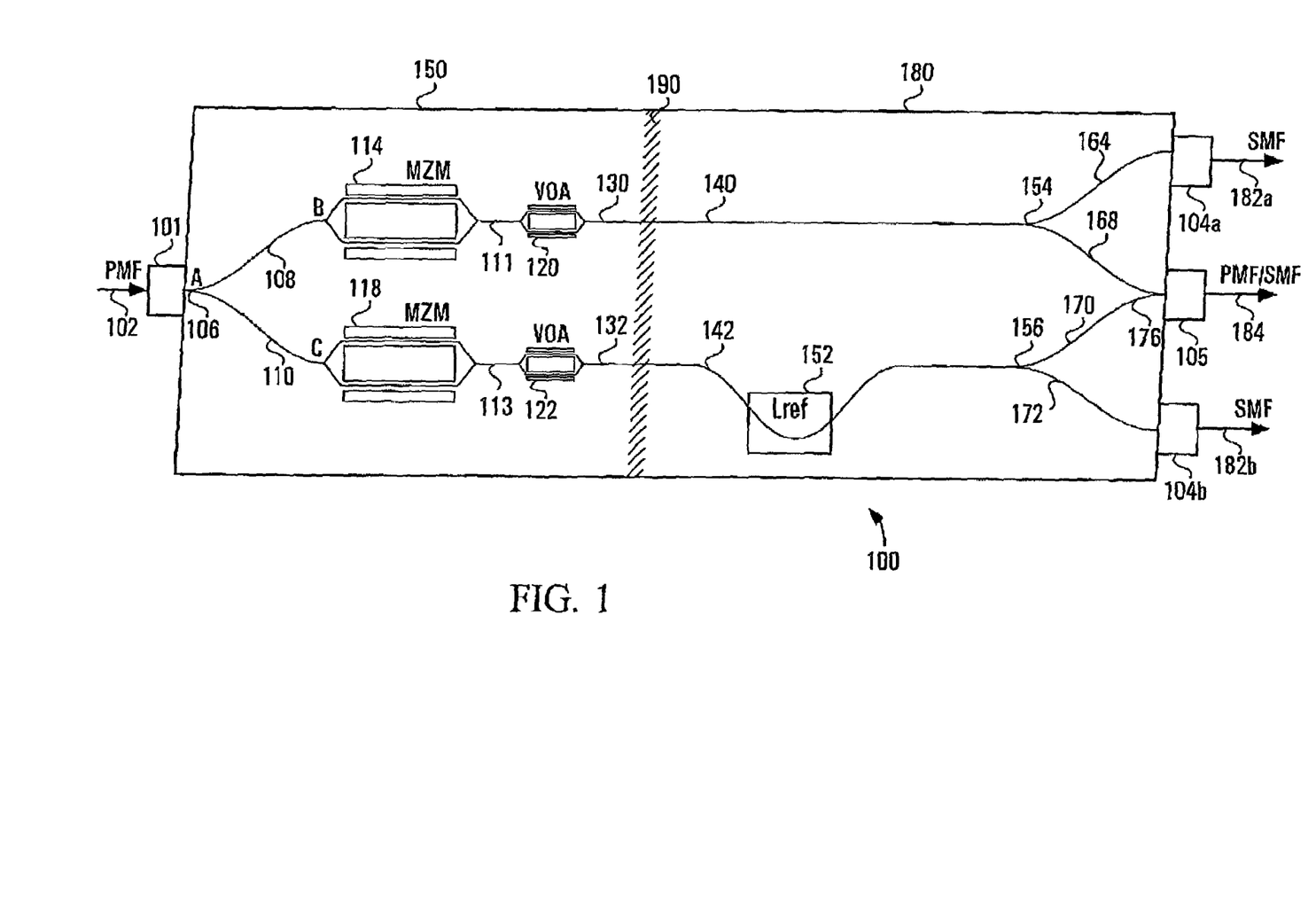
FIG. 1 depicts an example of a hybrid-integrated high-speed OTDM module according to a first embodiment of the invention.

FIG. 1 depicts a hybrid-integrated OTDM module 100 according to a first embodiment of the present invention. Broadly, the OTDM module 100 consists of a twin-modulator chip (TMC) 150 and a time-delay chip (TDC) 180 butt-coupled by an optical matching layer 190 (e.g. epoxy).

The twin-modulator chip 150 receives an input signal (not shown) via an input polarization maintaining fiber (PMF) 102 having an end portion secured within a fiber tube 101. The waveguide structure of the twin-modulator chip 150 comprises a Y-branch junction 106 which divides the input signal delivered by the input PMF 102 among waveguide portions 108 and 110 denoted by paths AB and AC, respectively. As the name suggests, the twin-modulator chip 150 comprises first and second Mach-Zehnder modulators 114 and 118 integrated on the same wafer whose outputs are fed, via waveguide portions 111 and 113, into first and second integrated variable optical attenuators (VOAs) 120 and 122, respectively. The outputs of VOAs 120 and 122 feed into waveguide portions 130 and 132, respectively. Therefore, a first optical path in the twin-modulator chip 150 comprises, in order, waveguide portion 108, MZM 114, waveguide portion 111, VOA 120 and waveguide portion 130. Similarly, a second optical path comprises waveguide portion 110, MZM 118, waveguide portion 113, VOA 122 and waveguide portion 132.

The time-delay chip (TDC) 180 is relatively simple in design. It consists of first and second waveguide paths 140 and 142 corresponding to waveguide portions 130 and 132, respectively, of the twin-modulator chip 150. The first waveguide path 140 continues to a Y-branch junction 154 which is designed to divide 5 to 10% of the incoming light into a waveguide arm 164 and the remaining 90 to 95% of the incoming light into a waveguide portion 168. The second waveguide path 142 is longer than waveguide path 140 as indicated by its curvature. A thermotransducer (electrode) 152 is integrated over waveguide path 142 for fine-tuning purposes. At a Y-branch junction 156, 5 to 10% of the light travelling along waveguide path 142 is divided into a waveguide arm 172 while 90 to 95% of the light is diverted into a waveguide portion 170. Waveguide arms 164 and 172 are coupled to output single mode fibers (SMFs) 182a and 182b, respectively, end portions of which are secured within corresponding fiber tubes 104a and 104b. Waveguide portions 168 and 170 terminate at a junction 176 which is coupled to an output PMF/SMF 184, having an end portion secured in a fiber tube 105.

In terms of operation, an optical short-pulse signal stream from a pulsed source e.g. clock pulse (not shown) arrives at the input of the hybrid-integrated OTDM module 100 via input PMF 102 secured in fiber tube 101. This short-pulse signal stream is then split by the Y-branch 106 among waveguide portions 108 and 110. The optical power splitting ratio at the Y-branch is 50% +/− h, the value h being a splitting ratio deviation in percentage and used to compensate for any power imbalance in the two optical paths (i.e. waveguide arms 108 and 110) due to, for example, imperfect processing. As a result, the optical powers of the input short-pulse signals presented to MZMs 114 and 118 will be the same.

However, the optical short-pulse signal streams will not generally arrive at their two corresponding MZM inputs at exactly the same time due to slight length differences between the waveguide portions 108 and 110. For a relatively large delay (>1 ps) between the two short-pulse signal streams at the MZM inputs, and assuming that the NRZ electrical gating signals (data streams), described below, are absolutely synchronized, one of the short-pulse signal streams will be somewhat out of alignment with its respective NRZ electrical gating signal. In such a case, an electrical phase shifter (not shown) may be required in the electrical feeding path to the particular MZM to compensate for any optical delay between paths AB 108 and AC 110. In this way, both NRZ electrical gating signals will be well aligned with their respective optical short-pulse streams at each MZM 114, 118.

Of course, the RZ optical signal streams output from the MZMs 114, 118 may also not be totally in phase to allow proper interleaving with one another. As an example, consider the case of multiplexing two 40 Gbit/s electrical signals to create an 80 Gbit/s optical signal. The 40 Gbit/s RZ optical signals output from MZMs 114 and 118 may not totally be in phase and, furthermore, the fixed delay introduced by the time-delay chip 180 might deviate from the required 12.5 picoseconds depending on processing accuracy. However, as will be discussed, the optical delay introduced by waveguide path 142 for one of the RZ optical signal streams may be fine tuned via the thermo-transducer (electrode) 152 integrated on the time-delay chip 180. Therefore, the total optical path difference between the two RZ optical signal streams emerging from MZMs 114 and 118 may be compensated for by the optical delay introduced by the time-delay chip 180 and fine tuning via the thermo-transducer 152. As a result, the bits of one RZ optical signal stream may always be brought to the middle of the time slot of the other RZ optical signal stream, thereby allowing for proper interleaving.

At each MZM 114 and 118, a modulating electrical NRZ signal (not shown) is applied to gate the respective incoming short-pulse signal stream. For the specific example of multiplexing two 40 Gbit/s data streams into an 80 Gbit/s optical signal, the modulating signal for each MZM 114 and 118 may correspond, for example, to a 40 Gbit/s electrical NRZ data stream. The principle of operation behind MZMs is well known in the art and will not be detailed. Essentially, it is sufficient to know that MZMs 114 and 118 convert the 40 Gbit/s NRZ electrical data streams to corresponding 40 Gbit/s RZ optical data streams.

The output power of each MZM 114 and 118 is then adjusted by respective VOAs 120 and 122. In other words, VOAs 120 and 122 are used for balancing the optical powers in both OTDM channels. As an aside, VOAs 120 and 122 may also be employed to apply low frequency modulation (dithering) to the two OTDM channels. Then, by detecting the optical power in each OTDM channel at time-delay chip fiber outputs 182a and 182b, the low frequency response may be fed back for controlling MZM settings such as bias voltage and RF swing. This type of controlling technology is well known in the art and will not be discussed. In any event, after passing through VOAs 120 and 122, the two 40 Gbit/s optical RZ signal streams continue along respective waveguide paths 130 and 132 towards the boundary of the twin-modulator chip 150.

At the boundary of the twin-modulator chip 150, the two 40 Gbit/s RZ optical signal streams pass from waveguide portions 130 and 132 into waveguide portions 140 and 142, respectively, of the time-delay chip 180. The fixed delay chip 180 is responsible for introducing a suitable delay between the 40 Gbit/s RZ optical signal streams in order to facilitate interleaving of the signals. As seen in FIG. 1, the delay between the 40 Gbit/s RZ signal streams is implemented physically by using waveguide portions 140 and 142, differing in length. For example, the waveguide portion 140 is generally straight while the waveguide portion (or tuning arm) 142 has some curvature associated with it indicating a longer path length.

The waveguide portion 142 also has some fine tuning capability associated with it, hence the alternate referral to it as a tuning arm. Specifically, fine tuning may be achieved by applying a voltage to the thermotransducer (electrode Lref) 152 over the waveguide path 142. The applied voltage introduces a certain change of refractive index for the waveguide portion below the electrode 152. In this manner, the optical phase of the incoming light may be changed. In other words, the particular RZ signal stream travelling along the waveguide portion 142 is delayed proportional to the applied voltage. Another functionality of the electrode 152 is to adjust the optical delay for slightly varying bit rates. For example, in OC768 systems with forward error correction (FEC), the bit rate is 43 Gbit/s instead of 40 Gbit/s. In this case, the required optical delay will be 11.6 picoseconds instead of 12.5 picoseconds. This deviation may be achieved by fine tuning with the electrode 152. In general, however, the delay introduced by waveguide portion 142 should be approximately one half the period of the RZ signal streams travelling in waveguide portions 140 and 142. To illustrate the high level of precision required, the delay required to produce an 80 Gbit/s RZ signal stream, for example, should be on the order of 12.5 ps +/− 0.2 ps.

The introduction of the time delay between the RZ optical signal streams travelling in waveguides 140 and 142 requires a very high order of precision. This is also the reason why the NRZ transmission format is not generally used in OTDM implementation. Since there are no distinct transitions between adjacent "1" bits in an NRZ signal, the pulse width in an NRZ signal may, at times, grow too wide to allow for interleaving after the delay. The RZ transmission format, on the other hand, uses a pulse width smaller than 5 ps, for example, for 80 Gbit/s transmission (i.e. very small duty cycle) thereby leaving a large margin to play with between successive bits of data. In this way, two RZ signal streams may be interleaved (time division multiplexed) with minimal crosstalk.

Referring back to FIG. 1, the 40 Gbit/s RZ optical signal streams travelling along waveguides 140 and 142 continue into waveguide portions 168 and 170, respectively, toward junction 176. At junction 176, the two 40 Gbit/s RZ optical signal streams are combined together via a power combiner to form an 80 Gbit/s RZ OTDM signal. In FIG. 1, junction 176 is schematically representative of any suitable power combiner available in the art which may be used for this purpose. Appropriate interleaving is achieved due to the different arrival time of the two signal streams. Specifically, the bits of the RZ signal stream from waveguide portion 140 always arrive at junction 176 12.5 ps ahead of the bits of the RZ signal stream from waveguide portion 142.

The 80 Gbit/s RZ OTDM signal is then pushed onto the output PMF/SMF 184 secured in fiber tube 105. The choice of PMF or SMF here depends on what stage is chosen to follow the OTDM module. For example, if the OTDM signal corresponds to the OTDM transmitter output, SMF should be used. However, if the output of the OTDM module is to be further connected to some amplification stage (e.g. semiconductor optical amplifiers), PMF should be used.

Junctions 154 and 156 are also designed to tap 5 to 10% of the optical power from the incoming RZ signal streams to waveguide portions 164 and 172, respectively. The tapped signals subsequently provided to SMFs 182a and 182b may be utilised for monitoring of the individual OTDM channels. In this way, the bias voltage and RF swing of each MZM 114 and 118 may be optimally controlled.

The twin-modulator chip 150 of the present invention may be realized using conventional waveguide technology to form optical waveguide paths on any suitable substrate. This component should be well known to those skilled in the art and may be made using, for example, optically active materials such as lithium niobate (LiNbO3) or polymers. Alternative substrate technologies include III-V group semiconductors such as indium phosphide (InP), its ternary (e.g. InGaAs) or quaternary (e.g. InGaAsP) alloys. Depending on whether lithium niobate or indium phosphide is chosen as the substrate material, Mach-Zehnder modulators (MZMs) or electro-absorption modulators (EAMs) may be fabricated, respectively. The implementation of such modulators is very established in the art. In any case, the modulators should have a very high frequency response (i.e. greater than 30 GHz for 40 Gbit/s). The VOAs 120 and 122 only require a bandwidth of several MHz, enough for applying dithering. For the purposes of the present invention, it is sufficient to know that the each MZM 114, 118 is simply responsible for modulating its incoming optical short-pulse signal with NRZ electrical data to produce an RZ optical signal stream.

The time-delay chip 180 may be implemented using another well established processing technique known in the art as silica-on-silicon technology. Curved waveguides, in particular, are very easily fabricated using this technology. Conventional LiNbO$_3$ or InP waveguides are not appropriate in this structure since they must be made very long to achieve a large bending radius, which is required to avoid any bending loss caused by the curved waveguide. Due to this fact, it is very difficult to create enough length difference between the two waveguide paths 140 and 142 in a small chip-size. Silica-on-silicon technology, however, allows for a very small bending radius without excessive bending loss. Advantageously, this technology may then be used to create a big length difference between the two waveguide paths 140 and 142 within a very small-size chip.

Lithium niobate and indium phosphide waveguide structures usually exhibit some polarisation dependence. Accordingly, the polarisation state of incoming light may be held constant via the PMF 102. If an SOA which is normally pigtailed with the PMF is connected to the OTDM chip, the OTDM chip should be pigtailed with the PMF. Only in this manner will the polarisation states of the optical signal be held constant which is necessary for use with an SOA.

Two important parameters that are key to determining the efficiency of coupling between two devices are the optical mode field diameter (OMFD) and the refractive index (RI). Optical mode field diameter (OMFD) may be defined as the lateral spatial distribution of optical intensity in waveguides. OMFD is dependent on both the geometry and material of the device at hand. For example, the optical output profile from an optical fiber is a circular beam whereas that from an optical waveguide is generally elliptical in shape due to the waveguide's rectangular shape. For efficient optical coupling of two devices, their OMFDs should be similar. Otherwise, a large insertion loss will be introduced.

The refractive index (RI), on the other hand, is dependent only on material characteristics. If the refractive indices of two optically coupled devices are not the same, part of the light will be reflected. The larger the refractive index difference between two coupled devices, the more light that is reflected. Therefore, differences in the refractive indices for two devices that are to be coupled will have a likewise negative impact on their coupling efficiency.

Accordingly, in order to achieve a high coupling efficiency between waveguide paths 130, 132 of the twin-modulator chip 150 and waveguide paths 140, 142 of the time-delay chip 180 in FIG. 1, the OMPD and refractive index (RI) of the twin-modulator chip 150 should be very similar to the OMFD and refractive index (RI) of the time-delay chip 180. If the above conditions are satisfied, any optical matching layer (e.g. epoxy or other suitable index-matching layer) with a refractive index (RI) in between the refractive indices of the twin-modulator chip 150 and the time-delay chip 180 may be used to couple and mechanically secure the chips after optical alignment. At the boundary of the twin-modulator chip 150 with the time-delay chip 180, an epoxy with refractive index (RI) matching with the RI of the twin-modulator chip 150 and time-delay chip 180 may be applied. In other words, if the RI for the twin-modulator chip 150 is n1 and the RI for the time-delay chip 180 is n2, the RI for the epoxy should be n1<n<n2. In this way, the back reflection may be minimised. Moreover, the facets of the twin-modulator and time-delay chips may be angled at, for example, between 6 to 8 degrees, to enhance back-reflection suppression. This feature is demonstrated in FIG. 1 by the two angled end facets of the integrated OTDM module 100.

It may not always be possible, however, for the OMFD and RI of the twin-modulator chip 150 to match the OMFD and RI of the time-delay chip 180. For example, the width of the active region of a twin-modulator chip based on LiNbO$_3$ or InP is usually smaller than its height resulting in the twin-modulator chip having an OMFD that is typically elliptical. On the other hand, the active region of a time-delay chip based on silica-on-silicon may be square in shape, resulting in an OMFD that is circular in nature. Moreover, the RI of LiNbO$_3$ is 2.2 while that of InP is greater than 3, quite different from silica having an RI of 1.5 (equivalent to optical fiber). Therefore, the above conditions will not be met.

Figure 2:
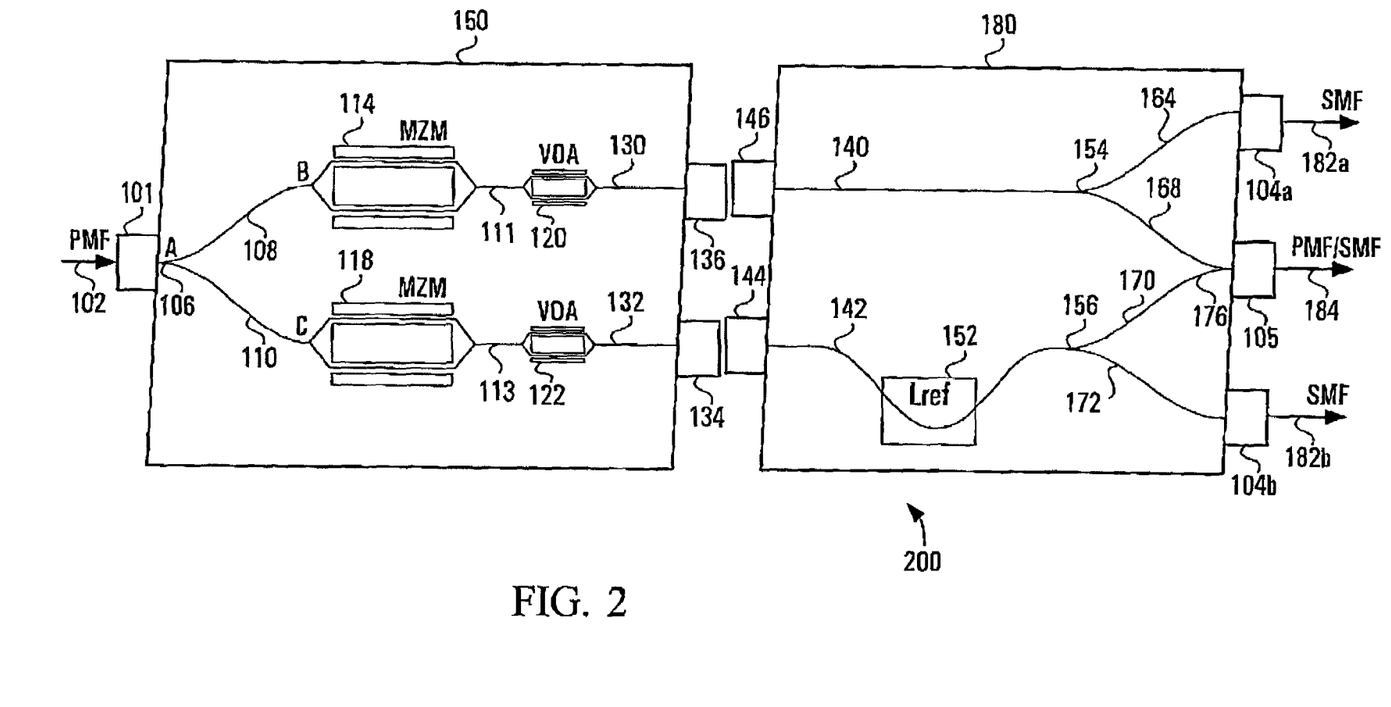
FIG. 2 depicts an example of a hybrid-integrated high-speed OTDM module according to a second embodiment of the invention.

Furthermore, optical alignment of waveguide 130 of the twin-modulator chip 150 with waveguide 140 of the time-delay chip 180 must necessarily be carried out simultaneously with the optical alignment of waveguide 132 and waveguide 142. Obviously, then, the distance between waveguides 130 and 132 of the twin-modulator chip 150 should be exactly the same as the distance between waveguides 140 and 142 of the time-delay chip 180. Such tolerances may not be achievable by the fabrication process. In such an event, the use of an optical matching layer such as epoxy to directly couple the twin-modulator chip 150 and the time-delay chip 180 is not appropriate. The use of some kind of matching block (e.g. collimating lenses) between the two chips 150, 180 then becomes necessary. An embodiment depicting the use of such collimating lenses to couple the twin-modulator chip 150 and the time-delay chip 180 is shown in FIG. 2 and described below. The implementation in FIG. 2 is identical, for the most part, to that of FIG. 1. Therefore, like components are denoted by like labels.

FIG. 2 depicts a hybrid-integrated high-speed OTDM module according to a second embodiment of the invention. The embodiment in FIG. 2 comprises a twin-modulator chip/lens/time-delay chip assembly. Specifically, the twin-modulator chip 150 is further comprised of two output collimating lenses 134 and 136 which are glued to waveguide portions 130 and 132, respectively, via epoxy (an optically transparent material). Similarly, the time-delay chip 180 further comprises two input collimating lenses 144 and 146 glued to waveguide portions 140 and 142, respectively. The advantage of using collimating beams for optical alignment is that the beam spots are enlarged which gives much more margin for optical alignment. In this way, the OMFD and RI matching problems as well as the tolerance problems of distances between waveguides of the twin-modulator chip and the time-delay chip are alleviated. By employing collimating lenses, then, waveguides 130 and 132 of the twin-modulator chip 150 may be easily coupled to waveguides 140 and 142 of the time-delay chip 180, respectively. The collimating lenses should be appropriately aligned and glued to their corresponding waveguides at their focal points i.e. the focal point of each lens should coincide with its corresponding waveguide.

Figure 3:
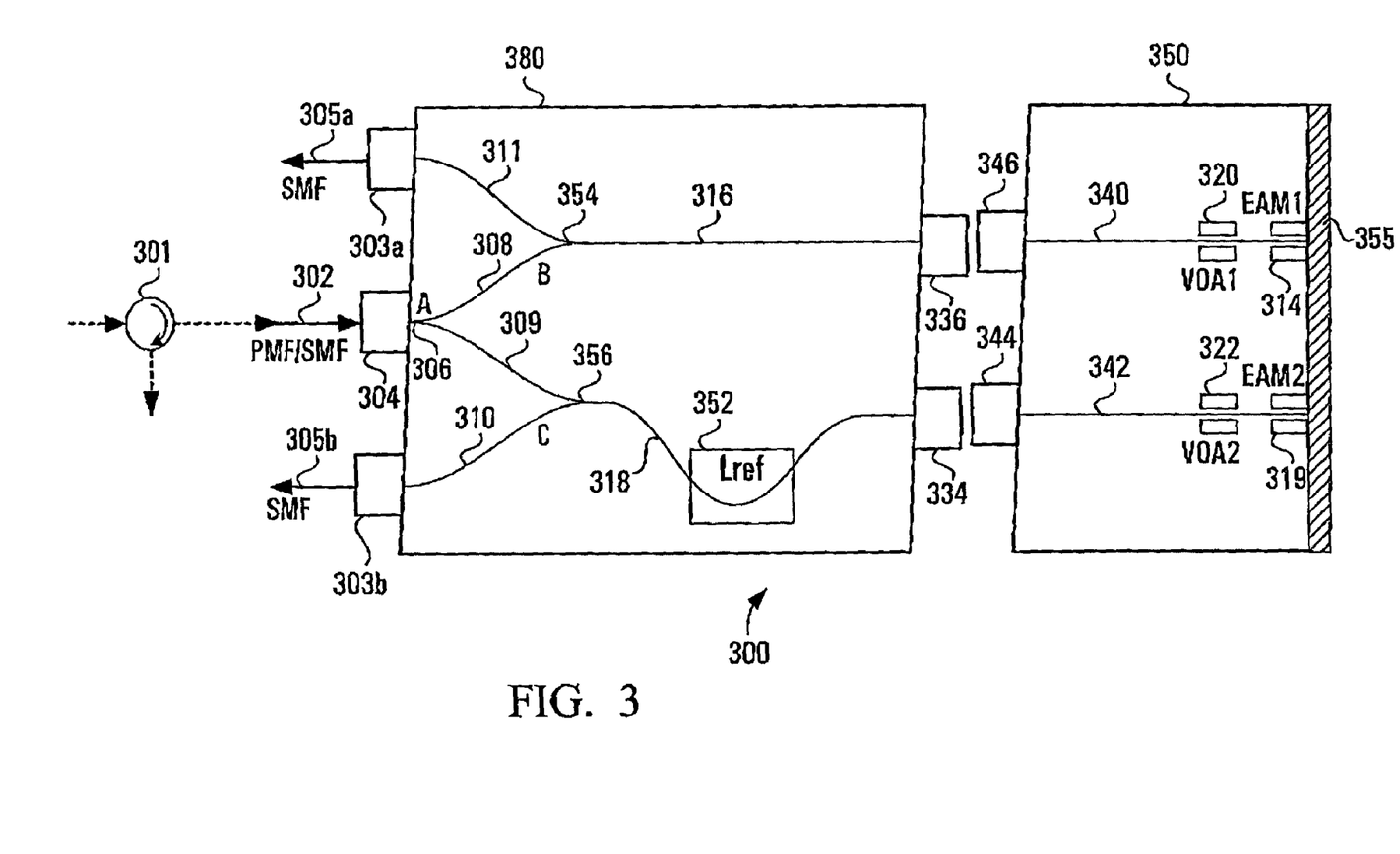
FIG. 3 depicts an example of a hybrid-integrated high-speed OTDM module according to a third embodiment of the invention.

FIG. 3 depicts a hybrid-integrated high-speed OTDM module 300 according to a third embodiment of the present invention. In this particular implementation, the OTDM module 300 comprises a time-delay chip/lens/reflective-type twin-modulator chip assembly. In the broadest sense, the OTDM module of FIG. 3 consists of a shorter time-delay chip 380 coupled to a twin-modulator chip 350 via collimating lenses 334, 336, 344 and 346 similar to those described in relation to FIG. 2.

The time-delay chip 380 consists of fiber tubes 303a and 303b which couple monitoring output SMF 305a and 305b to the time-delay chip 380. The time-delay chip 380 further comprises a fiber tube 304 which accepts an input/output PMF 302. In terms of its waveguide structure, the time-delay chip 380 consists of a Y-branch at junction 306 which divides the incoming light on PMF 302 to waveguide portions 308 and 309. Waveguides 308 and 309 continue through junctions 354 and 356 into waveguide portions 316 and 318, respectively. At junctions 354 and 356, waveguides 311 and 310 are used to tap 5–10% of the reflected light from waveguides 316 and 318, respectively. Waveguides 311 and 310 are specifically designed such that they do not impact the incoming light from waveguides 308 and 309. Waveguides 311 and 310 terminate at fiber tubes 303a and 303b, respectively. As in the previous embodiments, the optical delay necessary for interleaving RZ signal streams is introduced by using waveguides of differing length. In FIG. 3, this is indicated by the curvature associated with waveguide 318 of the time-delay chip 390. An electrode 352 is also included over waveguide 318 for fine tuning as described with relation to FIG. 1.

Waveguide path 316 proceeds uninterrupted to its respective collimating lens 336. Similarly, waveguide path 318 terminates at collimating lens 334. By using the collimating lens pairs 336, 346 and 334, 344, two RZ signal streams may be coupled from the time-delay chip 380 to the reflective-type twin-modulator chip 350.

The reflective-type twin-modulator chip 350 comprises waveguide paths 340 and 342 which correspond to waveguide paths 316 and 318, respectively, of the time-delay chip 380. Interposed in each waveguide path 340, 342 are respective variable optical attenuators (VOAS) 320, 322. The VOAs 320, 322 are used as before to compensate for any optical power imbalance in the two OTDM channels carried by waveguides 340, 342. Following each VOA 320 and 322 is a corresponding reflective-type electro-absorption modulator (EAM) 314 and 319.

As was the case for the embodiments depicted in FIGS. 1 and 2, the twin-modulator chip 350 and the time-delay chip 380 may each be fabricated using advanced waveguide processing technology. Such processing technologies will not be detailed here as they should be well known to those skilled in the art. For example, the basic concepts underlying such processing technologies may be found in recent publications on integrated optics. It should be noted, however, that only electro-absorption modulators (EAMs) may be used for the twin-modulator chip 350 since reflective-type MZMs based on $LiNbO_3$ do not exist. Accordingly, InP is an example of a suitable substrate which may be used for the twin-modulator chip.

The waveguide structure of the time-delay chip 380 in FIG. 3 may be fabricated using well known silica-on-silicon technology. Furthermore, the optical taps at junctions 354 and 356 may be implemented using waveguide coupler technology as was the case for the embodiment of FIG. 1.

Fabrication of the reflective-type twin-modulator chip 350 depicted in FIG. 3 will be slightly different from the common twin-modulator chip shown, for example, in FIG. 1. As seen, the reflective-type EAMs 314 and 319 are located at the edge of the twin-modulator chip 350. Such reflective-type EAMs are no different from typical EAMs with the exception that one of their facets is coated with a high-reflection (HR) coating 355. The role of the HR coating 355 is to totally reflect all light that impinges upon it.

In terms of operation, an input short-pulse signal stream passes through an optical circulator 301 external to the OTDM module 300 and arrives at input fiber tube 304 along the input/output PMF 302. The incoming short-pulse signal stream is divided at junction 306 by the Y-branch into the two waveguide portions 308 and 309. As was the case for the embodiment in FIG. 1, the optical power splitting ratio at the Y Branch is 50% +/– h%. The two short-pulse signal streams travelling along waveguides 308 and 309 pass through junctions 354 and 356, respectively, and continue uninterrupted into waveguide portions 316 and 318. The short-pulse signal streams travel along waveguides 316 and 318 towards collimating lenses 336 and 334 attached to the end facet of the time-delay chip 380.

However, the short-pulse signal stream travelling along waveguide 318 will be delayed with respect to the short-pulse signal stream travelling along waveguide 316 due to the path length difference between the waveguides (i.e. the curvature of waveguide 318). From an operational standpoint, it should be apparent that the only difference in the embodiment of FIG. 3 from that of FIGS. 1 and 2 is that the path length difference between waveguides 316 and 318 not only introduces an optical delay after the twin-modulator chip but now also before it. As a result, the incoming short-pulse signal streams to EAMs 314 and 319 of the twin-modulator chip 350 will not be synchronized and will, instead, have a certain phase difference between them. As in the embodiment of FIG. 1, the electrode 352 over waveguide 318 is for fine tuning the optical delay when required.

The collimating lenses 336 and 334 of the time-delay chip 380 are assumed to have been previously aligned and secured with collimating lenses 346 and 344, respectively, of the reflective-type twin-modulator chip 350. The collimating lens pairs 336, 346 and 334, 344 provide for efficient coupling of the two short-pulse signal streams travelling along waveguides 316 and 318 of the time-delay chip 380 into waveguides 340 and 342 of the twin modulator chip 350. The short-pulse signal streams coupled into the twin-modulator chip 350 travel along waveguides 340 and 342 and then encounter VOAs 320 and 322, respectively. As in the embodiment of FIG. 1, the VOAs 320 and 322 are used to balance the optical power in both OTDM channels.

Subsequent to VOAs 320 and 322 are reflective-type RAMs 314 and 319. Each EAM 314, 319 is responsible for modulating its respective short-pulse signal stream with electrical data. In order to synchronize the electrical NRZ data signals applied at EAMs 318 and 319 with each of their respective incoming short-pulse signal streams, RF phase shifters (not shown) may be introduced in the electrical signal feedline to each EAM. The role of the RF phase shifter is to synchronise each electrical NRZ gating signal with its respective incoming short-pulse signal stream at each respective EAM.

The active cavity length of each reflective-type EAM 314, 319 in FIG. 3 will be very small and on the order of, for example, 150 microns which translates to 3 ps for light incoming or being reflected back by the HR coating 355. In such a short time interval (e.g. 3 ps) only a single short-pulse will exist in the EAMs 314, 319 during which time the corresponding synchronized 40 Gbit/s electrical NRZ gating signals will be maintained in either a "1" or "0" state. Therefore, the gating effect at each EAM 314, 319 through application of the appropriate electrical NRZ signals may be enhanced by this double gating i.e. gating before and after reflection by the HR coating 355.

Therefore, the reflective-type EAMs 314 and 318 integrated within the twin-modulator chip 350 of FIG. 3 perform the same basic function as the MZMs 114 and 118 in FIG. 1 in that they convert the NRZ electrical data signal streams into RZ optical signal streams. Advantageously, the reflected RZ signal streams will possess a high extinction ratio as compared to single pass signal streams (as in FIG. 1) due to the double gating effect described above.

The two reflected optical RZ signal streams from EAMs 314 and 318 pass through VOAs 320 and 322 and then continue along waveguide paths 340 and 342, respectively, towards collimating lenses 346 and 344. After being coupled to the time-delay chip 380 via the collimating lens pairs 346, 366 and 344, 334 the two reflected optical RZ signal streams continue along waveguide paths 316 and 318. The reflected RZ signal stream travelling along waveguide 318 will obviously experience the same amount of delay as introduced by the path length difference between waveguides 316 and 318 in the forward direction. Because the total optical delay experienced by the RZ optical signal stream in waveguide 318 is the sum of the delays before and after modulation by EAM 319, the path length difference between waveguides 316 and 318 may be reduced by half as compared to the embodiment in FIG. 1. The reduced path length difference is advantageous in that it may ease fabrication of the curved waveguide 318 on the time-delay chip 380 and also improve stability on the whole. The reduced path length provides a further advantage in that the size of the time-delay chip 380 is also reduced.

The reflected optical RZ signal streams in the time-delay chip 380 travel along waveguides 316 and 318 towards junctions 354 and 356, respectively. At junctions 354 and 356, 5 to 10 per cent of the optical power in each optical RZ signal stream is tapped off into corresponding waveguide paths 311 and 310 and delivered to output SMFs 305a and 305b, respectively. The remaining 90 to 95 per cent of the optical power in each optical RZ signal stream continues along waveguides 308 and 309, respectively. At junction 306, the two reflected optical RZ signal streams travelling along waveguides 308 and 309 are combined to form an output OTDM signal stream having double the frequency (data rate) of each individual reflected optical RZ signal stream. Specifically, the output OTDM signal comprises a signal stream generated by interleaving one optical RZ signal stream, on a bit-by-bit basis, with the other optical RZ signal stream. The output OTDM signal stream generated at junction 306 leaves the time-delay chip 380 via PMF 302 whereby it is redirected at the optical circulator 301. It should be apparent that the optical circulator is necessary in the embodiment of FIG. 3 to isolate the incoming short-pulse signal stream from the output OTDM signal stream.

The OTDM module of the present invention may be designed to operate at any optical wavelength in the 1300–1550 nm wavelength band. In each of the embodiments depicted, angled polished facets at both sides each of each chip minimise optical back reflections. The distance between the waveguide paths carrying the two OTDM channels in each chip of the OTDM module should also be within very good tolerance as optical alignment can only be done on an entire chip basis rather than for the individual waveguide paths.

OTDM-based solutions are only now emerging as alternatives to existing DWDM solutions for meeting the bandwidth demands of the telecommunications industry. However, current OTDM-based solutions depend on the use of varying fiber lengths to achieve the prescribed optical delays required for interleaving of the various OTDM channels. Such solutions suffer from stability problems and offer no fine tuning capabilities since the optical delay is necessarily fixed by the length of the appropriate fiber. In other words, fiber-based OTDM solutions do not provide a tunability mechanism as may be required by OC768 systems, for example, where the bit rates prior to interleaving may vary from 40 Gbit/s to 43 Gbit/s.

Conventional fiber-based OTDM technology is bulky and complicated. The advantage of the present invention is that the key components of the OTDM module are integrated chips. Such an approach aids in reducing size and complexity as well as lowering the cost for assembly. Specifically, the delay of the present invention is introduced via a well known integrated chip solution i.e. silica on silicon. This waveguide process technology is widely used in the art for the fabrication of other components such as arrayed waveguide gratings (AWGs) and switches. Furthermore, the time-delay chip of the present invention is not totally 'fixed' as is the case for fiber-based OTDM modules. As discussed, the time-delay chip of the present invention does possess fine tuning capabilities thereby allowing for slight adjustments in the interleaving process when non-standard data transmission rates are required. For example, in OC768 systems with or without forward error correction (FEC), the bit rate of each optical RZ optical signal stream before combination will vary from 40 Gbit/s to 43 Gbit/s.

Although embodiments of the present invention have only been described in relation to multiplexing two electrical NRZ data streams into a single high-speed optical RZ stream, it should be obvious that the invention is not limited to 2×1 multiplexing and may be extended to 4×1, 8×1 etc. multiplexing schemes. For example, a modulator chip with four MZMs may be used to produce four optical RZ signal streams (at for example 40 Gbps) which may then be combined a time-delay chip having four waveguides of differing length to generate an even higher-speed output signal (at for example 160 Gbit/s). In other words, the simple embodiments described herein may be extended to achieve even higher data rate systems.

While preferred embodiments of the invention have been described and illustrated, it will be apparent to one skilled in the art that numerous modifications, variations and adaptations may be made without departing from the scope of the invention as defined in the claims appended hereto.

The invention claimed is:

1. An integrated optical time division multiplexing (OTDM) module comprising:
an integrated modulator chip for generating at least first and second optical Return-to-Zero signal streams; and
an integrated time-delay chip coupled to the integrated modulator chip for introducing a prescribed optical delay between the at least first and second optical Return-to-Zero signal streams and for combining the at least first and second optical Return-to-Zero signal streams after introduction of the prescribed delay, the integrated time-delay chip including a plurality of waveguides formed on a substrate of the integrated time-delay chip for introducing an optical delay and operable to guide the at least first and second optical Return-to-Zero signal streams through the integrated time-delay chip,
where the integrated time-delay chip is operable to combine the at least first and second optical Return-to-Zero signal streams including interleaving the plurality of waveguides on the integrated time-delay chip.

2. An integrated OTDM module according to claim 1 wherein the integrated modulator chip is a twin-modulator chip.

3. An integrated OTDM module according to claim 1 wherein the integrated time-delay chip introduces a fixed optical time delay between said first and second optical Return-to-Zero signal streams.

4. An integrated OTDM module according to claim 1 wherein the integrated time-delay chip introduces a tunable optical time delay between said first and second optical Return-to-Zero signal streams.

5. An integrated OTDM module according to claim 1 wherein the integrated time-delay chip comprises first and second waveguides for receiving said first and second optical Return-to-Zero signal streams from said integrated modulator chip, one of said first and second waveguides being of greater length than other of said first and second waveguides and both first and second waveguides being integrated within the integrated time-delay chip.

6. An integrated OTDM module according to claim 5 wherein an electrode is deposited over a portion of said first or second waveguide of the integrated time-delay chip that is greater in length, wherein a voltage applied to the electrode is used for fine tuning the optical time delay introduced by the integrated time-delay chip.

7. An integrated OTDM module according to claim 1 wherein an epoxy is used to couple optically and mechanically the integrated modulator chip to the integrated time-delay chip.

8. An integrated OTDM module according to claim 7 wherein the epoxy has a refractive index n, the integrated modulator chip has a refractive index n1, the integrated time-delay chip has a refractive index n2 and wherein the refractive index n of the epoxy is defined by $n1 > n > n2$.

9. An integrated OTDM module according to claim 1 wherein an optical refractive index matching layer is used to couple optically and mechanically the integrated modulator chip to the integrated time-delay chip.

10. An integrated OTDM module according to claim 9 wherein the optical refractive index matching layer has a refractive index n, the integrated modulator chip has a refractive index n1, the integrated time-delay chip has a refractive index n2 and wherein the refractive index n of the optical refractive index matching layer is defined by $n1 > n > n2$.

11. An integrated OTDM module according to claim 1 wherein the integrated modulator chip has a refractive index n1 and an optical mode field diameter OMFD1, the integrated time-delay chip has a refractive index n2 and an optical mode field diameter OMFD2 and wherein the refractive index n1 and optical mode field diameter OMFD1 of the integrated modulator chip is substantially similar to the refractive index n2 and optical mode field diameter OMFD2 of the integrated time-delay chip.

12. An integrated OTDM module according to claim 1 wherein collimating lenses are used to couple the integrated modulator chip to the integrated time-delay chip.

13. An integrated OTDM module according to claim 1 wherein the prescribed optical delay introduced between the first and second optical Return-to-Zero signal streams is approximately one half the period of each of the first and second optical Retain-to-Zero signal streams.

14. An integrated optical time division multiplexing (OTDM) module comprising:
an integrated modulator chip including an input fiber tube for receiving an end portion of an input fiber, first and second modulators each connected on input ends thereof to the input fiber tube and on output ends thereof to respective first and second variable optical attenuators, the first and second variable optical attenuators having respective first and second outputs coupled to an input end of an integrated time-delay chip; and
the integrated time-delay chip including first and second waveguides, formed on a substrate of the integrated time-delay chip and operable to guide a first and second optical Return-to-Zero signal streams through the integrated time-delay chip, for receiving said respective first and second outputs of said first and second variable optical attenuators of the integrated modulator chip, one of the first and second waveguides being of greater length than the other of the first and second waveguides, the integrated time-delay chip further comprising an output fiber tube for securing an end portion of an output fiber,
where the integrated time-delay chip is operable to combine the first and second optical Return-to-Zero signal streams including interleaving the first and second waveguides on the integrated time-delay chip.

15. The integrated optical time division multiplexing (OTDM) module of claim 14, further comprising an integrated modulator chip coupled to an integrated time-delay chip via an optical refractive index matching layer.

16. An integrated optical time division multiplexing (OTDM) module comprising:
an integrated modulator chip including an input fiber tube for receiving an end portion of an input fiber, first and second modulators each connected on input ends thereof to the input fiber tube and on output ends thereof to respective first and second variable optical attenuators, the first and second variable optical attenuators having respective first and second outputs coupled to an input end of an integrated time-delay chip; and
an integrated time-delay chip including first and second waveguides formed on a substrate of the integrated time-delay chip and operable to guide the first and second optical Return-to-Zero signal streams through the integrated fine-delay chip, for receiving said respective first and second outputs of the first and second variable optical attenuators of the integrated modulator chip, one of the first and second waveguides being of greater length than the other of said first and second waveguides, the integrated time-delay chip further comprising an output fiber tube for securing an end portion of an output fiber.

17. The integrated optical time division multiplexing (OTDM) module of claim 16, further comprising an integrated modulator chip coupled to an integrated time-delay chip via collimating lenses.

18. An integrated optical time division multiplexing (OTDM) module comprising an integrated time-delay chip coupled to an integrated modulator chip via collimating lenses wherein:

the integrated time-delay chip comprises an input fiber tube for receiving an end portion of an input fiber carrying an input optical signal stream, the integrated time-delay chip further comprising first and second waveguides, formed on a substrate of the integrated time-delay chip, each waveguide carrying an optical signal stream derived from the input optical signal stream and wherein one of said first and second waveguides is greater in length than the other of said first and second waveguides for providing a delay between the first and second optical signal streams, the first and second waveguides used for delivering the optical signal streams to the integrated modulator chip; and the integrated modulator chip comprises first and second waveguides for receiving the optical signal streams from the integrated time-delay chip, the integrated modulator chip further comprising first and second variable optical attenuators each connected on output ends thereof to respective first and second modulators and wherein an end facet of the integrated modulator chip is coated with a highly reflective coating.

19. An integrated optical time division multiplexing (OTDM) module comprising:

an integrated time-delay chip adapted to receive an incoming short-pulse signal stream from a pulsed source, the integrated time-delay chip comprising first and second waveguides formed on a substrate of the integrated time-delay chip for guiding the signal streams through the integrated-time delay chip and adapted to divide the incoming short-pulse signal stream into first and second short-pulse signal streams for transmission along the first and second waveguides of integrated time-delay chip, one of the first and second waveguides being of greater length than other of the first and second waveguides thereby introducing a prescribed optical delay between the first and second short-pulse signal streams; and an integrated modulator chip coupled to the integrated time-delay chip, the integrated modulator chip comprising first and second waveguides and adapted to receive the first and second short-pulse signal streams from the integrated time-delay chip and to generate first and second optical Return-to-Zero signal streams from the first and second short-pulse signal streams, wherein an end facet of the integrated modulator chip is coated with a reflective coating to reflect the first and second optical Return-to-Zero signal streams along the first and second waveguides of the integrated modulator chip towards the first and second waveguides of the integrated time-delay chip.

20. An integrated optical time division multiplexing (OTDM) module comprising:

an integrated modulator chip for generating a plurality of optical Return-to-Zero signal streams; and an integrated time-delay chip coupled to the integrated modulator chip for introducing prescribed optical time delays between each of the plurality of optical Return-to-Zero signal streams and for combining said plurality of optical Return-to-Zero signal streams after introduction of the prescribed delays, the integrated time-delay chip including a plurality of waveguides formed on a substrate of the integrated time-delay chip for introducing an optical delay and operable to guide the plurality of optical Return-to-Zero signal streams through the integrated time-delay chip, where the integrated time-delay chip is operable to combine the plurality of optical Return-to-Zero signal streams including interleaving the plurality of waveguides on the integrated time-delay chip.

* * * * *